United States Patent

Glaser

[15] 3,689,910

[45] Sept. 5, 1972

[54] ELECTROOPTICAL DISPLAY SYSTEM INCLUDING OPTICAL ENCODING MEANS

[72] Inventor: David Glaser, Green Brook, N.J.

[73] Assignee: Burroughs Corporation, Detroit, Mich.

[22] Filed: Oct. 28, 1970

[21] Appl. No.: 84,561

[52] U.S. Cl.........340/324 R, 315/108, 235/61.11 CR

[51] Int. Cl.................................................G06k 9/12

[58] Field of Search.....40/130 K, 130 G, 134, 130 E, 40/130 D, 130 H; 178/15, 30; 340/324 R, 334, 336, 380; 235/61.11 E, 61.11 CR; 313/108; 315/169 TV

[56] References Cited

UNITED STATES PATENTS

| | | | |
|---|---|---|---|
| 3,532,873 | 10/1970 | Batson et al. | 340/380 |
| 2,765,458 | 10/1956 | Hoover | 340/380 |
| 3,573,531 | 4/1971 | Kerstetter et al. | 313/108 R |
| 2,682,043 | 6/1954 | Fitch | 178/15 |
| 3,109,065 | 10/1963 | McNaney | 178/30 |
| 3,461,301 | 8/1969 | Fitzmaurice et al. | 235/61.11E |

*Primary Examiner*—John W. Caldwell
*Assistant Examiner*—Marshall M. Curtis
*Attorney*—Kenneth L. Miller, Robert A. Green, George L. Kensinger and Charles S. Hall

[57] ABSTRACT

An electrooptical display system includes a display panel having a plurality of gas-filled glow cells and electrodes for scanning or firing the cells in accordance with a predetermined pattern. The system includes a transparency which carries a message to be transmitted and a novel pickup for reading light which passes through the transparency and generating electrical signals therefrom. The signals can be used at a remote location to reconstitute the message or for any other purpose.

9 Claims, 5 Drawing Figures

INVENTOR
David Glaser
BY Robert A. Green
ATTORNEY

INVENTOR.
David Glaser

ELECTROOPTICAL DISPLAY SYSTEM INCLUDING OPTICAL ENCODING MEANS

BACKGROUND OF THE INVENTION

Electrooptical systems for reading messages and generating electrical signals therefrom are known in the art. Such known systems generally include cathode ray tubes or other relatively complex and expensive apparatus. The present invention utilizes, instead of a cathode ray tube and its associated circuitry, a recently developed flat panel device which includes a plurality of small gas-filled, light-producing cells, the panel being relatively simple and inexpensive. In the invention, the panel is combined with other relatively simple apparatus to provide a compact, uncomplex and inexpensive system of a type not now known in the prior art.

SUMMARY OF THE INVENTION

Briefly, a display panel embodying the invention includes a plurality of gas-filled glow cells and electrode means for scanning or firing the cells in accordance with a predetermined pattern. Means are provided for reading the glow pattern and generating signals therefrom to present a remote display of light generated by the panel.

DESCRIPTION OF THE PREFERRED EMBODIMENTS

Figure 1:
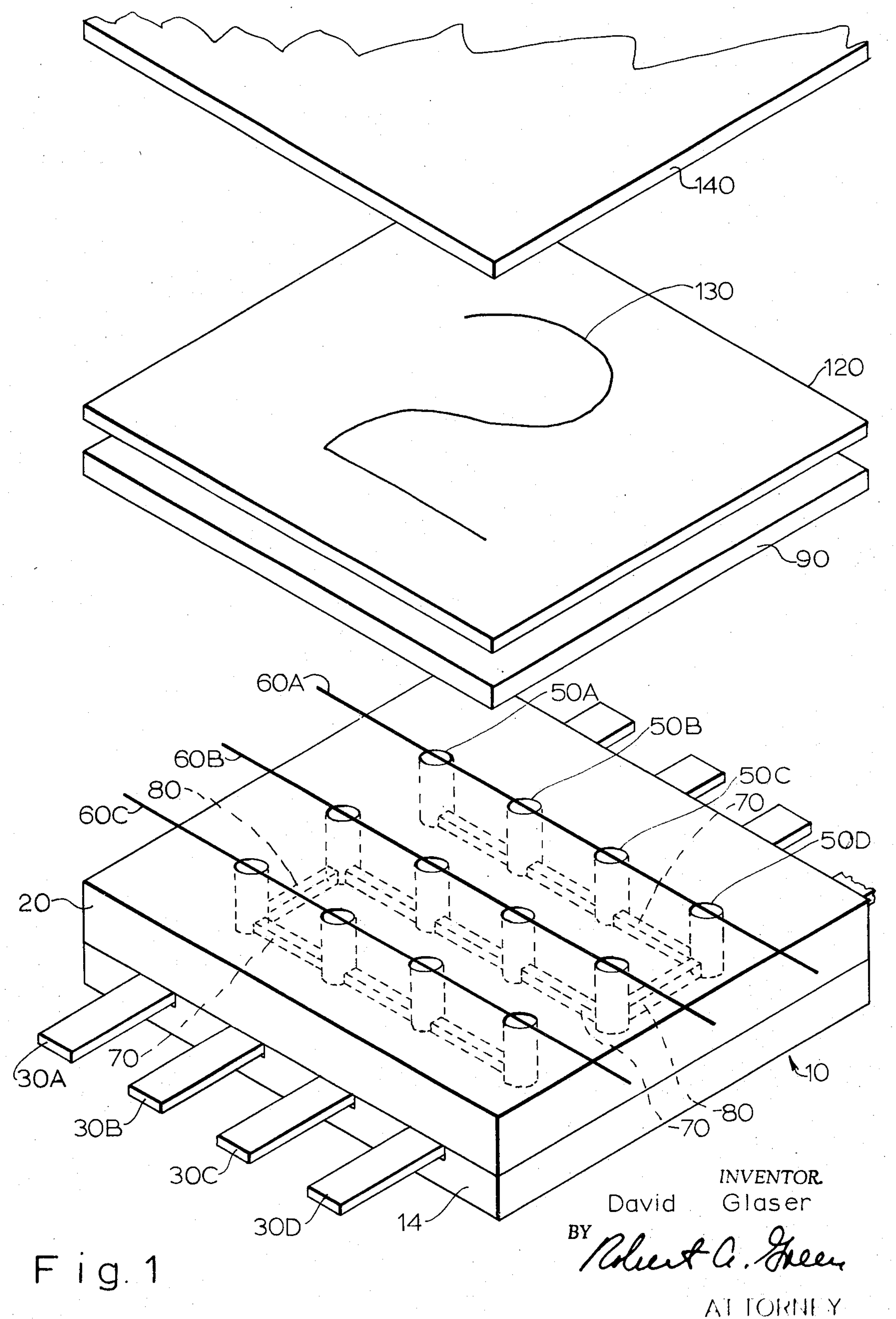
FIG. 1 is an exploded view of an electrooptical display system embodying the invention.
Figure 2:
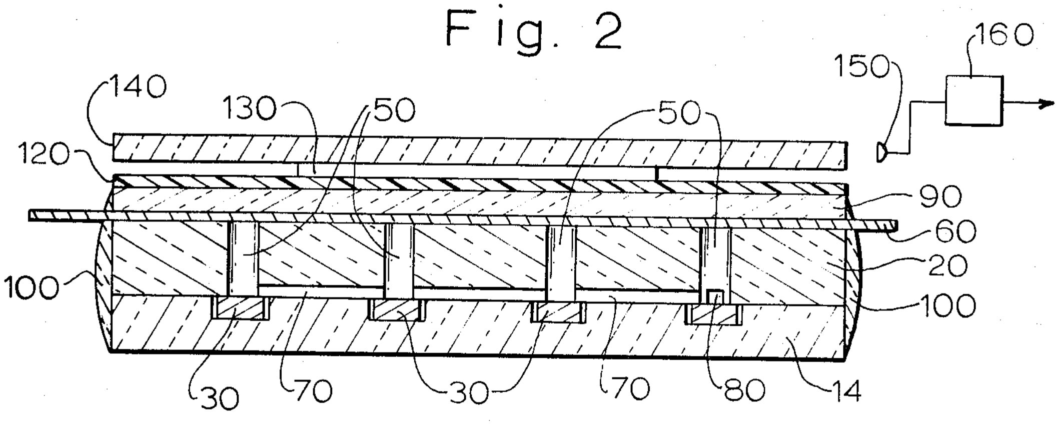
FIG. 2 is a sectional view of the apparatus of FIG. 1 when assembled and including a portion of an electrical circuit usable therewith.

Referring to FIGS. 1 and 2, a display panel 10 embodying the invention comprises a sandwich of elements which include, from bottom to top, a first insulating base plate 14 of glass, ceramic, or the like which comprises one portion of the panel envelope. The panel next includes a plate 20 of glass, ceramic, or the like, having a top surface and a bottom surface, and a plurality of parallel electrodes 30 are disposed between the plates 14 and 20. The electrodes 30 are used as cathodes and may comprise wires, metallic strips, or the like, and they may be seated in depressions in the top surface of plate 14 ( as shown) or in the bottom surface of the plate 20, if desired. Plate 20 is provided with rows and columns of apertures or cells 50, with each column of cells overlaying and aligned with a cathode electrode.

An array of second electrodes 60 is seated on the top surface of plate 20. The electrodes 60 are used as anodes and are preferably wires oriented parallel to each other and at an angle of 90° to the cathode electrodes. Thus, each anode wire is aligned with a row of cells 50, and each crosses each of the cathode electrodes at a cell 50.

Figures 3, 4, 5:
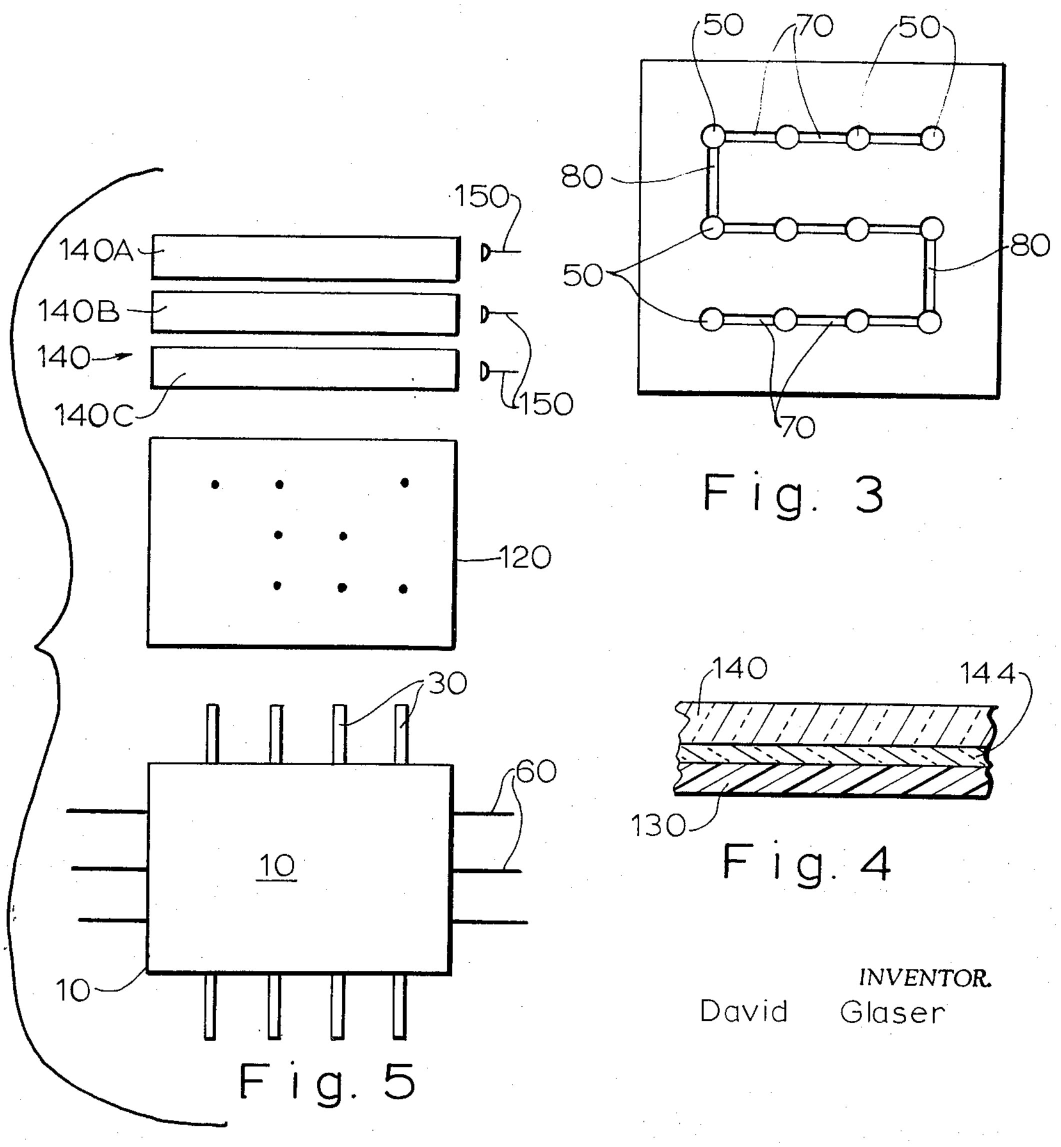
FIG. 3 is a bottom view of a portion of the apparatus of FIG. 1.
FIG. 4 is a sectional view of a portion of a modification of the apparatus of FIG. 2.
FIG. 5 is an exploded view of a modification of the system of the invention.

The bottom surface of plate 20 is provided with a plurality of parallel slots 70 which extend horizontally as seen in FIGS. 1 and 3 along the rows of cells 50 and thus interconnect the cells of each row. In addition, a vertical slot 80 is provided as shown between the last cell 50 in the first row and the adjacent last cell in the second row, between the first cell in the second row and the first in the third row, and between the last cell in the third row and the last cell in the fourth row, etc., so that, in effect, all of the cells 50 are connected in a continuous series by the horizontal slots 70 and by the specially located vertical slots 80.

A transparent glass cover plate 90 completes the panel 10, and the various plates 14, 20, and 90 are hermetically sealed together along their adjacent edges by a seal 100 formed of a suitable material such as a glass frit or the like. Electrodes 30 and 60 extend through the seal 100 so that external circuit connection can be made thereto.

The operating package in which panel 10 is used includes a transparent or translucent film or plate 120 which carries a message or picture 130 to be transmitted to a remote location. The plate 120 may be a sheet of plastic, and message 130 can be written thereon with a grease pencil or the like. A light control plate 140 is seated on the film or plate 120. The light control plate 140 is opaque and has the characteristic that light which enters its surface from the panel generates fluorescent light internally, and this is reflected laterally and exits through the edges of the plate. This characteristic of the plate is achieved by using a material such as Lucite for the plate and impregnating it with a fluorescent material.

The fluorescent material used is one which is sensitive to the light generated in the gas cells in panel 10. Gases and fluorescent materials to operate with them can be readily obtained by those skilled in the art. If desired, the fluorescent material may be provided as a thin layer 144 (FIG. 4) on the lower surface of plate 140 adjacent to film 120. Plate 140, containing phosphor particles, operates as follows. When light enters the plate through its lower surface facing gas cells 50, the light strikes various phosphor particles which themselves generate light. This generated light is scattered in all directions, with some traveling to the edges of the plate. Similarly, if the fluorescent material is provided as thin layer 144, light generated in the layer enters plate 140 at all angles and some travels to the edge of plate 140.

One or more photocells 150 are positioned facing an edge of the plate, and the photocells are connected to suitable circuit elements 160 for generating and transmitting electrical signals representative of the light generated in panel 10. These signals can be reconstituted at a remote location to recreate the picture or message 130.

In one mode of operation of the panel 10 and the entire system of the invention, the cells 50 are scanned by being turned on, one at a time in raster fashion, beginning with, say, the first cell at the upper lefthand corner of the plate 20, and continuing from cell to cell along the top row to the righthand end, from which the scan proceeds directly vertically to the next adjacent row and to the last cell therein, from which it proceeds to the left along the second row to the first cell at the end of the second row and then downwardly to the first cell in the third row, and from there to the end of the third row, and so forth, to the last cell.

Briefly, in carrying out this type of scanning operation generally positive potential is applied to the uppermost anode wire 60A, and all of the other anodes are maintained at ground or some generally negative potential. At the same time, the first cathode 30A associated with the first column of cells has generally negative potential applied to it while the other cathodes remain at some generally positive potential. With these potentials applied, the first cell 50A in the top row is fired and glows. Next, the second cathode 30B has generally negative potential applied to it, and the first cathode has generally positive potential applied to it, and the glow transfers from the first cell 50A to the second cell 50B in the first row. This operation of switching of the cathodes is carried out until the glow reaches the last cell in the first row. The transfer of glow along the first row of cells is facilitated by the common horizontal slot 70 which couple these cells together. With the last cathode 30D still carrying its operating potential, generally positive potential is applied to the second anode 60B associated with the second row of scanning cells, and the first anode 60A is lowered in potential, and this causes the glow to transfer from the last cell in the first row to the adjacent last cell in the second row. This operation is facilitated by the presence of vertical slot 80 between these last cells in the first and second rows.

Now, with operating potentials again applied to each of the cathodes 30 in turn, but in the reverse order beginning at the righthand end and proceeding to the lefthand end of the panel as seen in FIG. 1, the glow is transferred by means of slots 70 toward the left along the second row of cells. When the glow reaches the last or left-most cell in the second row, the second and third anodes are now switched in potential, with the third anode being raised and the second anode being lowered, and the glow transfers through the associated slot 80 to the first cell in the third row of cells. The scanning operation is now again carried out to the right along the third row. In this way, the scanning operation is carried out cell by cell and row by row throughout the entire number of cells in the lower portion of the panel.

As the scanning of cells 50 is carried out from cell to cell, light passes from each cell through plate or film 120 and into plate 140 in which it is directed to the edges from which it exits and is picked up by the photocells and transmitted to a remote location. It can be seen that the opaque message 130 prevents light from cells obstructed by the message from reaching plate 140, and this condition is reflected in the signal picked up and transmitted by the photocells at each instant.

A modification of the invention shown in FIG. 5 includes the panel 10, in any suitable size, and a message carrying film 120. In this case film 120 carries a message which is in code form for example as shown. The code illustrated may represent a message or a character or the like. It is noted that the elements of the message are arrayed in rows corresponding to the rows of cells in panel 10. In this modification of the invention, the phosphor plate 140 is divided into three separate portions 140A, B, and C, which are separated from each other, and each of which overlays a row of message elements in film 120 and a row of light cells in the panel 10. A separate pickup photo cell 150 is positioned adjacent to and in operative relation with each of the strips 140A, B, C of the phosphor sheet 140.

The apparatus of FIG. 4 is operated generally in the manner described above and it is particularly suited for use in a comparator system. In such a system, apparatus at one location scans and reads a message and generates signals therefrom and the apparatus of FIG. 4 does the same for the message film 120. The two sets of signals are fed into a comparator which detects identity or disparity in the two sets of signals.

I claim:

1. A display system comprising
a display device including
an array of elements including means for generating radiation and electrode means for sequentially energizing each element to produce said radiation,
a message-carrying member overlaying said array of elements and positioned to receive said radiation therefrom,
said member including translucent and opaque portions disposed to form a message carried thereby,
a plate overlaying said message-carrying member so that it can receive radiation generated by said elements and transmitted through said member,
auxiliary radiation-producing means associated with said plate and in position to receive radiation which passes through said message-carrying member,
said auxiliary radiation-producing means generating radiation when it receives radiation from said elements, some of the radiation generated thereby traveling along said plate to the edges thereof, and sensing means positioned adjacent to an edge of said plate for receiving radiation appearing at said edge of said plate.

2. The system defined in claim 1 wherein said auxiliary radiation-producing means includes particles of phosphor material which are adapted to generate radiation in response to radiation received from said display device.

3. The system defined in claim 1 wherein said auxiliary radiation-producing means comprises a layer of phosphor material disposed between said message-carrying member and said plate, said phosphor material being adapted to generate radiation within said plate in response to radiation received from said display device.

4. The system defined in claim 1 wherein said elements are arrayed in rows and columns, and said system includes means for energizing each of said elements in turn to generate a raster pattern of radiation.

5. The system defined in claim 1 wherein said elements of said display device comprise gas-filled light-producing cells.

6. The system define in claim 4 wherein said plate is made up of a plurality of separate strips, each aligned with and overlaying a row of said elements so that each said strip is positioned to receive radiation from a row of elements, and electrooptical means at an edge of each of said strips for receiving radiation therefrom.

7. A display system comprising a display device including
- a plurality of individual gas-filled light-producing cells arrayed in rows and columns in a common layer,
- electrode means coupled to each cell for firing each cell,
- said electrodes and said cells including means for firing said cells in a continuous series beginning with the first cell in the first row and extending from row to row to the last cell in the last row,
- a message-carrying member seated on said panel overlaying said array of light-producing cells,
- said member including translucent and opaque portions defining a message carried thereby,
- a plate seated on said message-carrying member and overlaying said array of light-producing cells and thus positioned to receive light generated by said cells and transmitted through said member,
- said plate including means within its body for receiving light from said cells and generating light in response thereto and transmitting at least some of said generated light laterally to the edges of said plate, and sensing means positioned adjacent to an edge of said plate for receiving radiation appearing at said edge of said plate.

8. The system defined in claim 7 wherein said sensing means includes electrooptical means positioned in operative relation with an edge portion of said plate for receiving light which exits therefrom for generating an electrical signal therefrom.

9. The system defined in claim 7 wherein said plate is made up of a plurality of separate strips, each aligned with and overlaying a row of said cells so that each said strip is positioned to receive radiation from a row of cells, and electrooptical means at an edge of each of said strips for receiving radiation therefrom.

* * * * *